US012415097B2

(12) United States Patent
Goodman

(10) Patent No.: US 12,415,097 B2
(45) Date of Patent: Sep. 16, 2025

(54) PERSONAL PROTECTED-AIR SYSTEM

(71) Applicant: Kathy E. Goodman DO, Inc., Delray Beach, FL (US)

(72) Inventor: Kathy E. Goodman, Delray Beach, FL (US)

(73) Assignee: KATHY E. GOODMAN DO, INC., Delray Beach, FL (US)

(*) Notice: Subject to any disclaimer, the term of this patent is extended or adjusted under 35 U.S.C. 154(b) by 896 days.

(21) Appl. No.: 17/560,314

(22) Filed: Dec. 23, 2021

(65) Prior Publication Data

US 2023/0201634 A1 Jun. 29, 2023

(51) Int. Cl.

| | |
|---|---|
| ***A62B 18/00*** | (2006.01) |
| ***A41D 13/11*** | (2006.01) |
| ***A62B 7/12*** | (2006.01) |
| ***A62B 18/02*** | (2006.01) |
| ***A62B 23/02*** | (2006.01) |
| *A62B 7/14* | (2006.01) |

(52) U.S. Cl.

CPC ............ *A62B 18/003* (2013.01); *A41D 13/11* (2013.01); *A62B 7/12* (2013.01); *A62B 18/025* (2013.01); *A62B 23/02* (2013.01); *A62B 7/14* (2013.01)

(58) Field of Classification Search

CPC ..... A62B 18/003; A62B 18/02; A62B 18/045; A62B 18/00; A62B 7/12; A62B 18/025; A62B 23/02; A62B 7/14; A62B 17/00; A41D 13/11

See application file for complete search history.

(56) References Cited

U.S. PATENT DOCUMENTS

| | | | | |
|---|---|---|---|---|
| 8,276,582 | B2 * | 10/2012 | Bridges | A62B 18/04 128/201.24 |
| 2011/0226240 | A1 * | 9/2011 | Navalesi | A61M 16/06 128/201.23 |
| 2018/0132550 | A1 * | 5/2018 | Czajka | A62B 18/045 |
| 2018/0296864 | A1 * | 10/2018 | Feasey | A62B 18/003 |
| 2021/0290989 | A1 * | 9/2021 | Hall | G02F 1/0126 |
| 2021/0346732 | A1 * | 11/2021 | Tu | A62B 23/02 |

* cited by examiner

*Primary Examiner* — Margaret M Luarca

*Assistant Examiner* — Sarah B Lederer

(74) *Attorney, Agent, or Firm* — Peter J. Van Bergen

(57) ABSTRACT

A personal protected-air system includes a ring adapted to fit over a user's head. The ring includes a port for receiving breathable air, a manifold in fluid communication with the port, and vents in fluid communication with the manifold. The vents are distributed about a portion of the ring. A face mask is coupled to the ring. The face mask has a first edge, a second edge, and mask material extending from the first edge to the second edge. The first edge is coupled to the ring adjacent to the portion thereof where the vents are so-distributed. The second edge is adapted to fit snugly against the user's cheeks and nose bridge wherein the mask material is spaced apart from the user's nostrils and mouth by an air space and wherein the breathable air enters the air space via the vents.

25 Claims, 8 Drawing Sheets

PERSONAL PROTECTED-AIR SYSTEM

CROSS-REFERENCE TO RELATED PATENT APPLICATIONS

This patent application is co-pending with one related patent application entitled "PERSONAL PROTECTED-AIR SYSTEM", application Ser. No. 17/488,390, filed Sep. 29, 2021, by the same inventor and owned by the same assignee as this patent application.

FIELD OF THE INVENTION

The invention relates generally to breathable-air protection systems, and more particularly to a protected-air system for an individual in an enclosed environment and/or in environments having the potential for the presence of large amounts of airborne infectious pathogens, man-made contaminants, dust, and/or dirt.

BACKGROUND OF THE INVENTION

In 2020, the outbreak of the COVID-19 virus alerted the world to the potentially deadly nature of airborne infectious pathogens. When such airborne infectious pathogens are readily transmitted by humans via their aerosolized particles expelled during breathing, speech, singing, coughing, sneezing, etc., anyone in the proximity of the aerosolized particles can be infected. The risk of infection is greatly increased when people share an enclosed environment such as those defined by aircraft, land vehicles, enclosed spaces/rooms, and/or relatively open but heavily-populated environments (e.g., airports, terminals, arenas or stadiums, amusement parks, subway and train platforms, etc.).

The recent awareness of the health risks posed by airborne infectious pathogens has also highlighted the need to protect oneself from other airborne particles that can present long-term health risks. Indeed, many work environments routinely and consistently expose inhabitants thereof to a variety of airborne particles that include man-made contaminants, dust, and dirt over the course of a work day. For example, construction workers routinely work in dirty and dusty environments, painters using sprayers are routinely exposed to clouds of aerosolized paint particles, etc.

Currently, when in any environment that presents a high risk of inhalation of airborne infectious pathogens, man-made contaminants, dust, dirt, etc., medical and science experts advise people to wear a face mask that covers one's nose and mouth. While face masks are effective at greatly reducing airborne pathogen transmission and/or inhalation of health-damaging particles, face masks can make breathing more difficult and can be uncomfortable when worn for extended periods. In addition, the air one breathes when wearing a mask never feels like "fresh air". Thus, the drawbacks of mask wearing frequently lead to incorrect wearing of masks and/or their premature removal, both of which negate the advantages of wearing a mask.

SUMMARY OF THE INVENTION

Accordingly, it is an object of the present invention to provide a personal protected-air system.

Another object of the present invention is to provide a personal system that can provide a user with fresh and/or filtered air in order to protect a user from airborne infectious pathogens, man-made contaminants, dust, dirt, etc., that may be present in an ambient air environment.

Still another object of the present invention is to provide a personal protected-air system that avoids the drawbacks of traditional face masks.

Yet another object of the present invention is to provide a personal protected-air system for use during vehicle or air travel as well as any multiple-hour scenario in which one is exposed to health-damaging airborne particles.

Other objects and advantages of the present invention will become more obvious hereinafter in the specification and drawings.

In accordance with the present invention, a personal protected-air system includes a ring adapted to fit over a user's head. The ring includes a port accessible from a first external region of the ring and adapted to receive breathable air, a manifold in fluid communication with the port, and a plurality of vents in fluid communication with the manifold and a second external region of the ring. The vents are distributed about a portion of the ring. A face mask is coupled to the ring. The face mask has a first edge, a second edge, and mask material extending from the first edge to the second edge. The first edge is coupled to the ring adjacent to the portion thereof where the vents are so-distributed. The second edge is adapted to fit snugly against the user's cheeks and nose bridge wherein the mask material is spaced apart from the user's nostrils and mouth by an air space and wherein the breathable air enters the air space via the vents.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
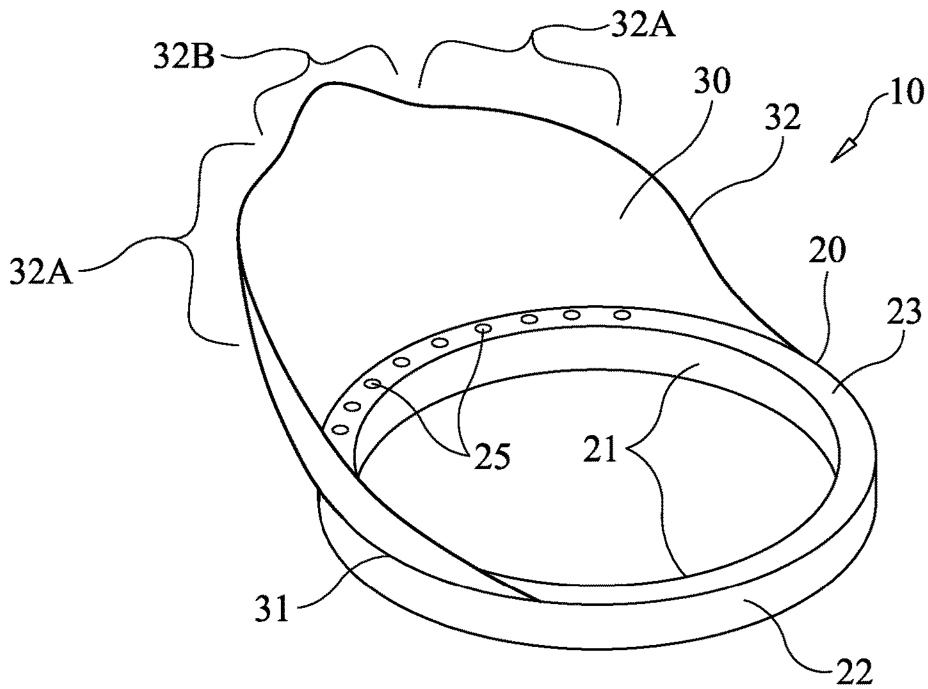
FIG. 1 is a perspective view of a personal protected-air system in accordance with an embodiment of the present invention.

Referring now to the drawings and more particularly to FIG. 1, a perspective view of a personal protected-air system in accordance with an embodiment of the present invention is shown and is referenced generally by numeral 10. As will be explained further below, system 10 is sized and shaped to fit over a user's head to define an air space in front of a portion of the user's face that can be supplied with breathable air. The breathable air can originate from a filtered-air source (e.g., a filtered-air nozzle located above one's seat on an aircraft/train/bus, a portable filtered-air supply, etc.), or can originate from a fresh/outdoor air source without departing from the scope of the present invention. In some embodiments of the present invention, a flexible open-ended conduit or hose (not shown in FIG. 1) can be provided to couple a breathable-air source (not shown) to system 10 as will be described further below.

Protected-air system 10 includes a ring 20 and a face mask 30. In general, ring 20 and face mask 30 are configured such that, when system 10 is worn by a user, ring 20 fits over a user's head and will encircle a region of the user's neck (i.e., below the user's chin and jawline) when face mask 30 is placed in position against the user's face as will be described further below. Accordingly, face mask 30 is said to be at the front of system 10. A variety of materials can be used for each of ring 20 and face mask 30 without departing from the scope of the present invention. Material choices and construction details for system 10 can be based on an application's design criteria such as the environment of use, cost, durability, weight, bio-degradability, etc.

Figure 2:
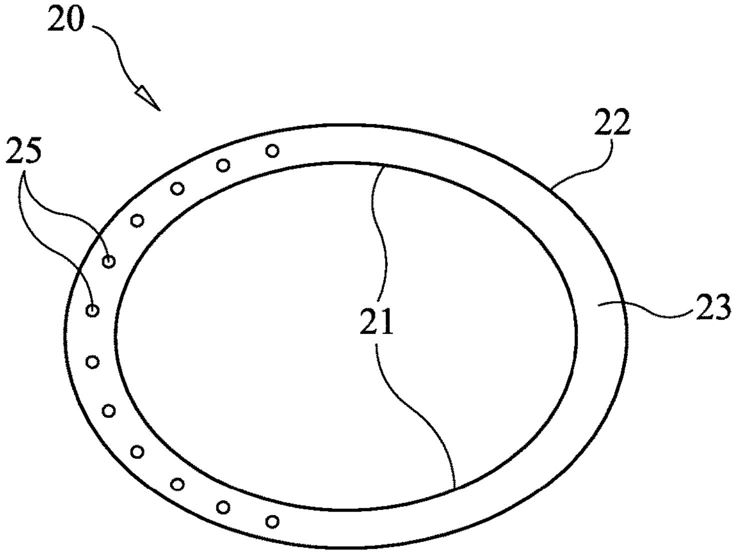
FIG. 2 is an isolated top plan view of the personal protected-air system's ring.
Figure 3:
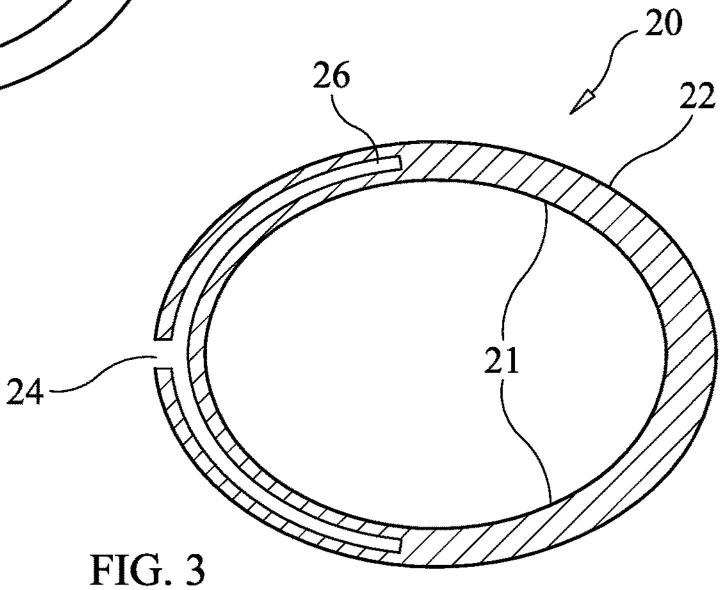
FIG. 3 is a cross-sectional view of the personal protected-air system's ring illustrated in FIG. 2.

Details of ring 20 will now be explained with additional reference to FIGS. 2 and 3 where an isolated top plan view of ring 20 is illustrated in FIG. 2 and a cross-sectional view of ring 20 is illustrated in FIG. 3. Ring 20 can be configured in a variety of ways without departing from the scope of the present invention. By way of non-limiting examples, ring 20 can a one-piece structure, a multiple-piece modular structure, or an inflatable structure. Ring 20 has a central opening 21 sized and shaped to fit over a user's head such that ring 20 will also easily encircle a user's neck (i.e., below the user's chin and jaw line) when system 10 is worn. Ring 20 has a peripheral external surface 22 and a top external surface 23. At least one port 24 (FIG. 3) is provided in peripheral external surface 22 and a plurality of holes or vents 25 (FIG. 2) are provided in a portion of top external surface 23. Port 24 is in fluid communication with a manifold 26 (FIG. 3) formed or disposed within ring 20. Vents 25 are also in fluid communication with manifold 26. Port 24 can be configured in a variety of ways without departing from the scope of the present invention. In some embodiments of the present invention, port 24 can be configured with quick-connect features that allow it to be readily attached/detached to/from one end of a hose that provides breathable air (e.g., filtered or fresh air under pressure) to ring 20. Such quick-connect features can utilize one or more of magnetic couplings, mechanical couplings, elasticized couplings, etc., without departing from the scope of the present invention. A check valve (not shown) can be disposed in port 24 to assure that the flow of air can only enter port 24 at peripheral external surface 22, but not exit therefrom.

As mentioned above, manifold 26 is contained within ring 20 and is in fluid communication with port 24 and vents 25. In use, breathable air is introduced into manifold 26 through port 24 for distribution from manifold 26 via vents 25. In embodiments of the present invention incorporating a check valve in port 24, air entering manifold 26 through port 24 can only exit manifold 26 through vents 25. When system 10 is in use with ring 20 encircling a user's neck and with port 24 at/near the front of the user's neck, vents 25 are distributed about the front and sides of the user's head. Accordingly, when system 10 is worn by a user in this fashion and is coupled to a source of breathable air under pressure (e.g., an aircraft's filtered-air nozzle) at port 24, breathable air under pressure is admitted into manifold 26 and exits ring 20 via vents 25.

Face mask 30 can be made from any of a variety of mask materials (e.g., fabric, paper, etc.), can comprise one or more layers of material, can be flaccid or semi-rigid to hold a preformed shape, can be made from opaque and/or transparent materials, etc., without departing from the scope of the present invention. Face mask 30 is attached along one (lower) edge 31 thereof to ring 20. In general, edge 31 is coupled to ring 20 at least along the portion thereof where vents 25 are located such that vents 25 are disposed between edge 31 and central opening 21 of ring 20. In the illustrated embodiment, edge 31 is coupled to surface 22 and/or surface 23 along more than half of the circumference of ring 20. Edge 31 can be permanently or removably coupled to peripheral external surface 22 and/or top external surface 23. Removable coupling of face mask 30 to ring 20 will provide for the replacement or laundering of face mask 30. Removable coupling can be achieved in a variety of ways (e.g., elasticity of the material used for face mask 30, elastic banding, hook-and-loop fasteners, magnetic fasteners, snaps, zippers, etc.) without departing from the scope of the present invention.

Face mask 30 extends from its coupled edge 31 to its second uncoupled (upper) edge 32. Edge 32 can commence and end at ring 20, and is shaped to trace a line of contact with a user's face at the cheeks and nose bridge thereof. That is, regions 32A of edge 32 will contact a user's cheeks as region 32B contacts a user's nose bridge. Since edge 32 forms the contact with a user's face, edge 32 is configured to snugly and comfortably engage the user's cheeks and nose bridge. For example, edge 32 can be elasticized along some or all of its length thereby allowing edge 32 to conform to the contours of the user's cheeks and nose bridge. Padding (not shown) could also be provided along edge 32 for comfort and/or to improve the fit between edge 32 and the user's cheeks and nose bridge. The combination of ring 20 and face mask 30 eliminates the need to use any ear "loops" to hold face mask 30 in place. The amount of "grip" that edge 32 makes with a user's face can be controlled by, for example, the elasticity of edge 32 and the start/stop locations of edge 31 on ring 20.

System 10 provides a user with a variety of personal protected-air scenarios. At a minimum, a user fits system 10 over their head such that ring 20 encircles the user's neck.

From this position, a user can pull face mask 30 into place over the user's face as described above. Since ring 20 is large enough to pass over the user's head, face mask 30 is held away from the user's nostrils, mouth and chin. More specifically, human anatomy readily dictates that ring 20 will tend to hang off the back of the user's neck, while the weight of ring 20 causes the front portion thereof to rest on or just above the user's clavicle-to-sternum region just below their neck. The size and shape of ring 20 cooperate to cause face mask 30 to be spaced apart from a user's face and chin when face mask 30 is worn. In some embodiments of the present invention, ring 20 can be configured to provide for some minor shape modifications by a user so that the user can customize the spacing between their face and face mask 30. The spacing between face mask 30 and a user's face can be enhanced by utilizing a semi-rigid face mask configuration that holds face mask 30 out from one's face as edge 32 engages the user's cheeks and nose bridge.

In another use scenario with system 10 worn as just described, system 10 can be coupled to a supply of breathable air at its port 24. When the breathable air is pressurized in the ring's manifold 26, the breathable air will be injected into the air space between face mask 30 and the user's face (i.e., at the region thereof that includes the user's nostrils and mouth) via vents 25. As mentioned above, one such source of breathable air is the filtered-air nozzle found above a passenger seat of an aircraft.

Figure 4:
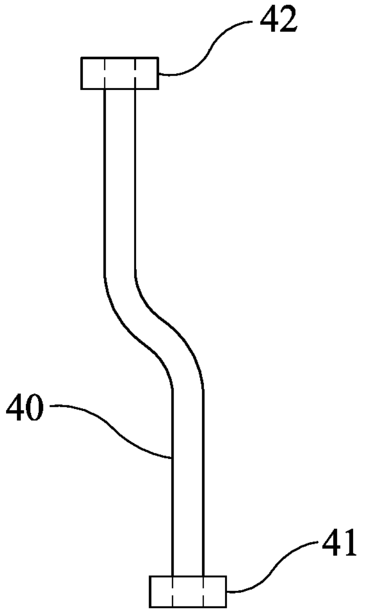
FIG. 4 is a side view of a hose used to couple the personal protected-air system to an air nozzle through which breathable air passes.

In some embodiments of the present invention, a flexible open-ended conduit or hose 40 (FIG. 4) can be provided to couple a breathable-air source (not shown) to system 10. If the above-described port 24 is configured with quick-connect features, hose 40 can have a mating coupling feature 41 at one end of conduit 40. The other end 42 of conduit 40 can be configured for a quick connect/disconnect to/from a filtered-air nozzle typically found over each passenger seat of an aircraft, train, or bus. Such quick-connect features can utilize one or more of magnetic couplings, mechanical couplings, elasticized couplings, etc., without departing from the scope of the present invention.

Figure 5:
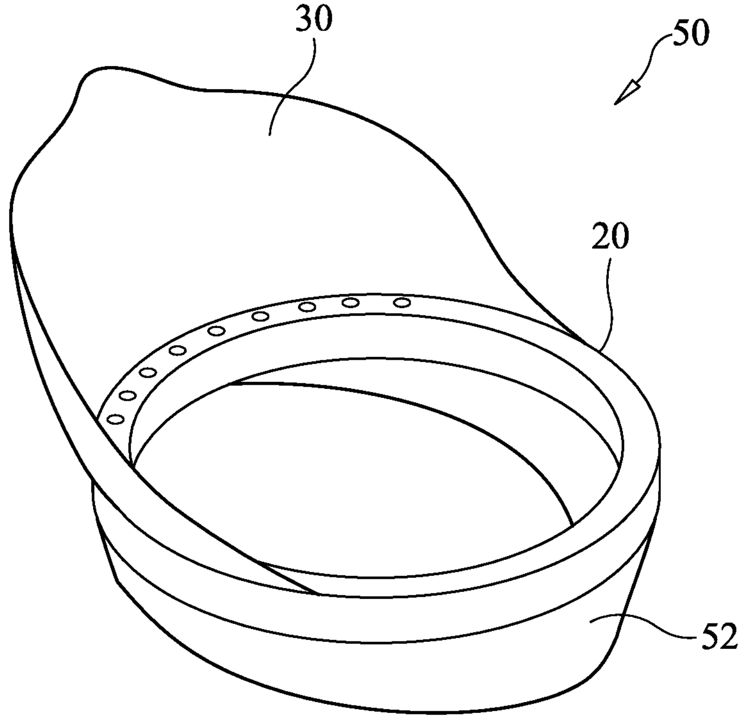
FIG. 5 is a perspective view of a personal protected-air system further including a neck cushion in accordance with another embodiment of the present invention.

In some embodiments of the present invention, the protected-air system's ring 20 can have a flexible-material cushion coupled thereto such that the cushion serves as a neck pillow. For example, a personal protected-air system 50 illustrated in FIG. 5 includes a cushion 52 included with or coupled to the bottom of ring 20. Cushion 52 partially encircles a user's neck when one wears protected-air system 50. Cushion 52 will allow the user to support their head in a comfortable position while seated in an aircraft seat or land vehicle seat. The size, shape, and materials used for cushion 52 are not limitations of the present invention.

Figure 6:
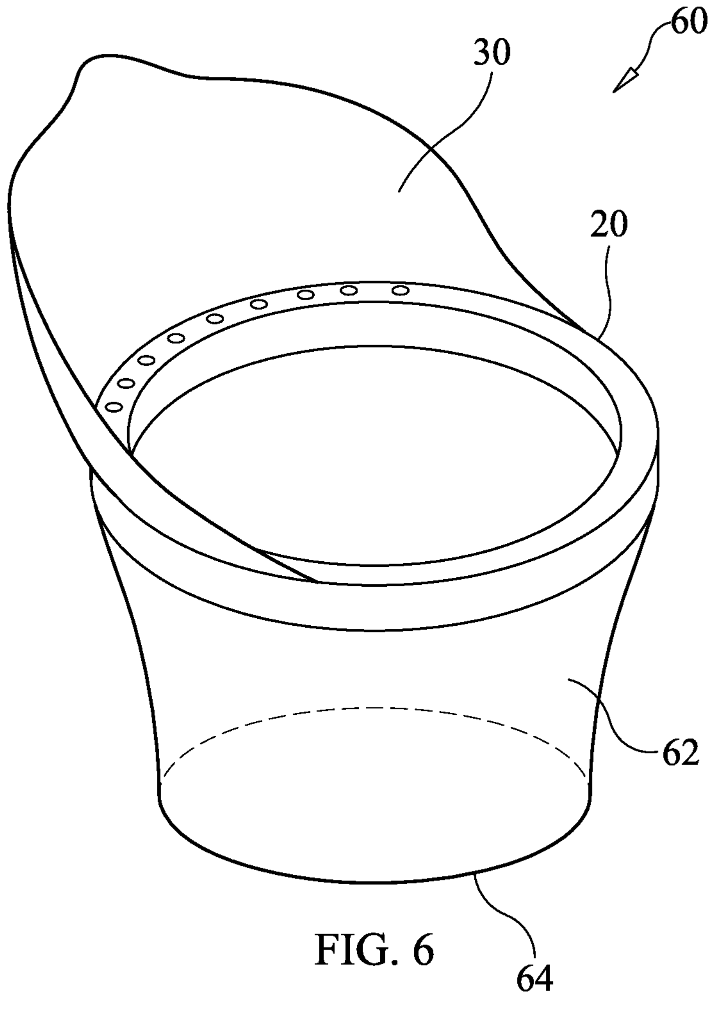
FIG. 6 is a perspective view of a personal protected-air system further including a neck-engaging sleeve in accordance with another embodiment of the present invention.

In some embodiments of the present invention, an additional "ring" (or sleeve) of flexible material can be included with or coupled to the bottom of ring 20 in order to provide a comfortable and circumscribing engagement with a user's neck. For example, a personal protected-air system 60 illustrated in FIG. 6 includes a separate or integrated ring/sleeve 62 of flexible material coupled to or integrated with the bottom of ring 20 to essentially define an elasticized outboard opening 64 of ring 20 that can expand/stretch over one's head, and then contract/relax to conform to a user's neck. Ring/sleeve 62 can be made from an air filtering material. In this way, any of the user's exhaled breath exiting system 60 through ring/sleeve 62 will be filtered before entering the ambient air environment thereby protecting other individuals from potential infectious pathogens container in the user's exhaled breath.

Figure 7:
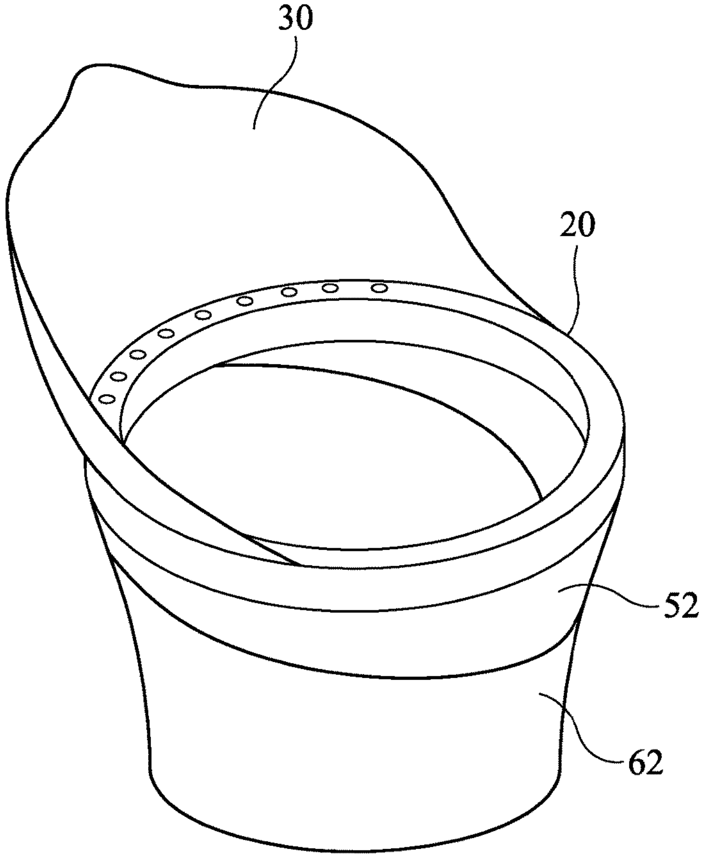
FIG. 7 is a perspective view of a personal protected-air system further including a neck cushion and a neck-engaging sleeve in accordance with another embodiment of the present invention.

In some embodiments of the present invention, the protected-air system's ring 20 can have both the above-described flexible-material cushion and flexible ring/sleeve coupled thereto. For example, a personal protected-air system 70 illustrated in FIG. 7 includes the above-described cushion 52 included with or coupled to the bottom of ring 20 and the above-described ring/sleeve 62 of flexible material coupled to or integrated with the bottom of cushion 52 and/or the bottom of ring 20.

Figure 8:
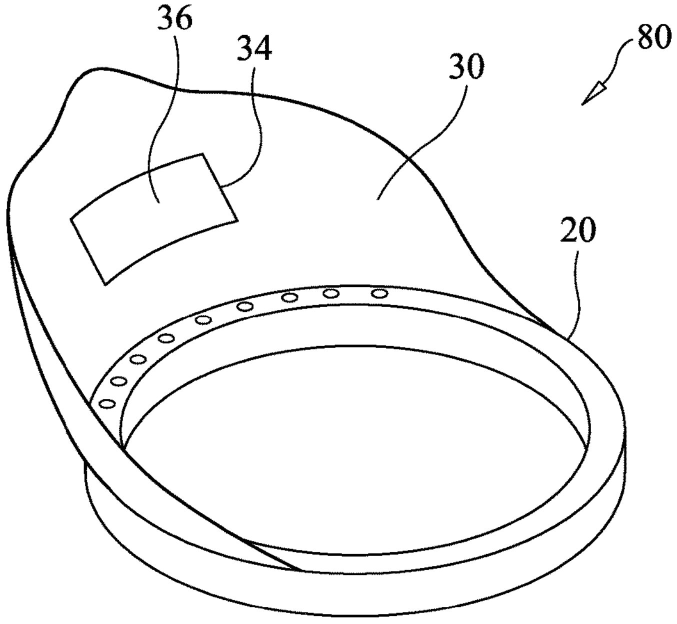
FIG. 8 is a perspective view of a personal protected-air system further including a nutrition receiving port in accordance with another embodiment of the present invention.

In some embodiments of the present invention, the protected-air system's face mask 30 can be provided with a sealable aperture that a user can access/open to pass a straw or eating utensil through without removing the protected-air system. For example, a personal protected-air system 80 illustrated in FIG. 8 includes an aperture 34 in face mask 30 that will be located near a user's mouth when they are wearing the protected-air system with face mask 30 engaging the user's face as described above. Aperture 34 is sealed by a door 36 that can be constructed in a variety of ways (e.g., integrated with face mask 30, attached to face mask 30, etc.) without departing from the scope of the present invention.

Figure 9:
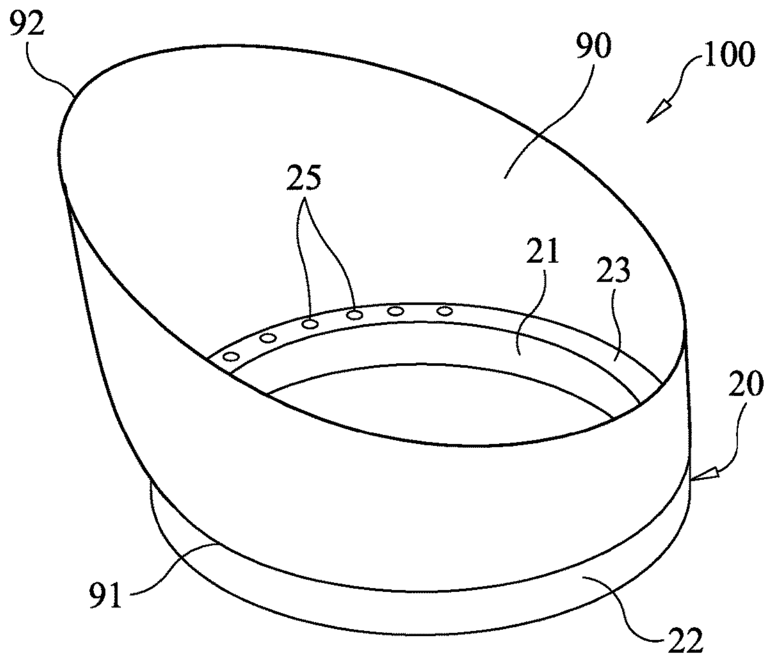
FIG. 9 is a perspective view of a personal protected-air system in accordance with another embodiment of the present invention.

In some embodiments of the present invention, the face mask portion of the personal protected-air system is an open-ended sleeve of face mask material coupled to ring 20. For example, a personal protected-air system 100 illustrated in FIG. 9 has a face mask 90 coupled to ring 20. More specifically, face mask 90 is an open-ended sleeve of flexible face mask material having a lower open end 91. Open end 91 and ring 20 are coupled to one another all along their adjoining circumferences. An outboard upper end 92 of sleeve 90 will form the face-engaging portion of face mask 90. End 92 can be elasticized or all of face mask 90 could be made from an elastic material without departing from the scope of the present invention.

Figure 10:
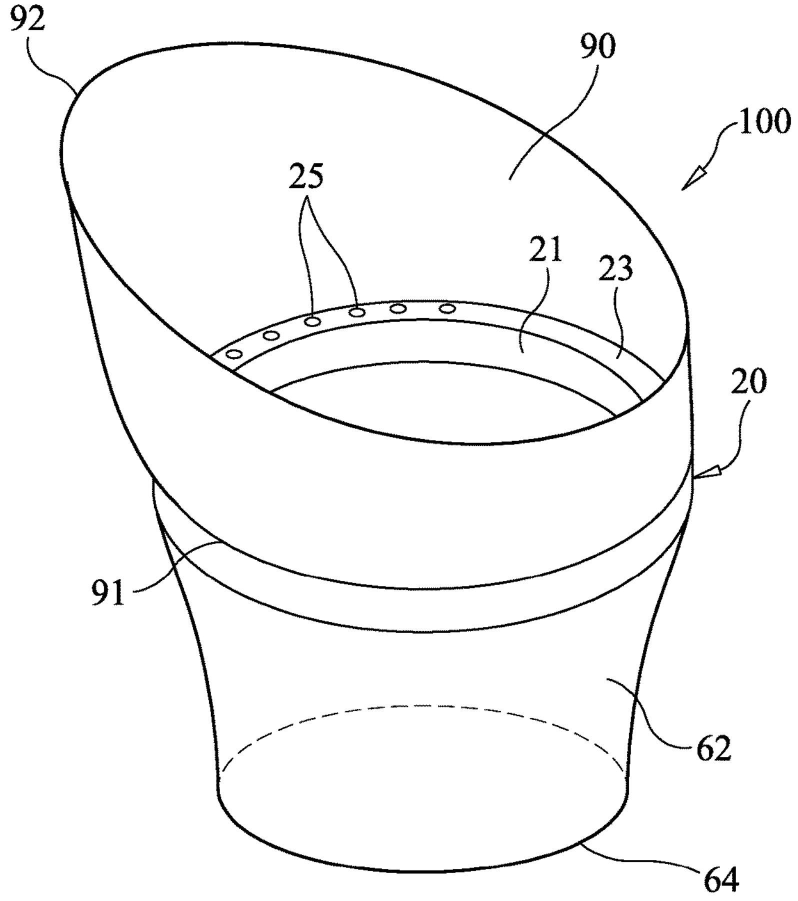
FIG. 10 is a perspective view of the personal protected-air system shown in FIG. 9 and further including a neck-engaging sleeve in accordance with another embodiment of the present invention.

In some embodiments of the present invention, the above-described face mask sleeve 90 can be extended to encircle/engage a user's neck. For example, a personal protected-air system 110 illustrated in FIG. 10 has the above-described face mask 90 and the above-described flexible/elasticized sleeve 62 (FIG. 6) coupled to ring 20 for engagement with a user's neck when system 110 is worn. Face mask 90 and sleeve 62 can be separate elements or integrated with one another without departing from the scope of the present invention.

Figure 11:
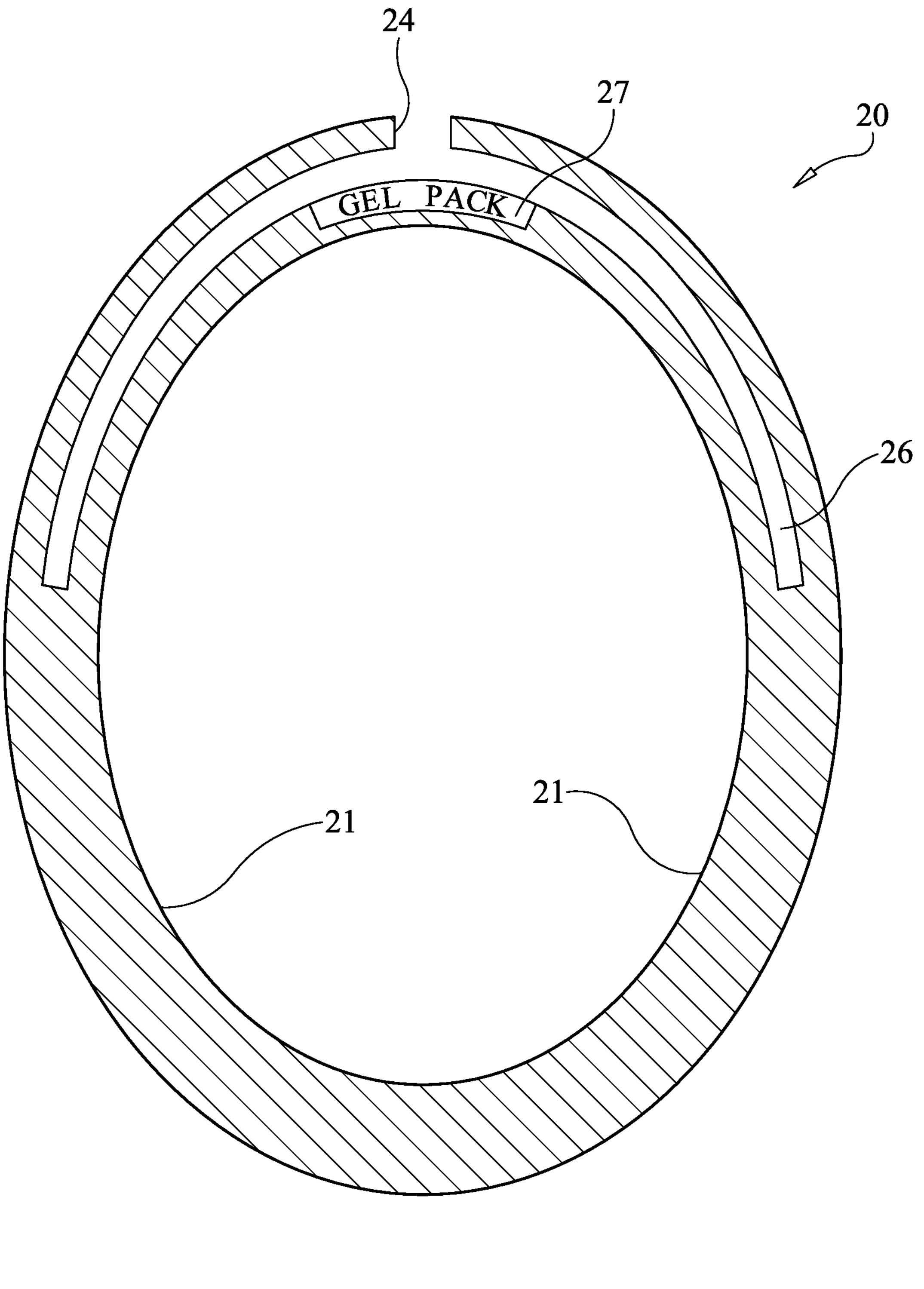
FIG. 11 is a cross-sectional view of a personal protected-air system's ring further including a gel pack in the ring's manifold in accordance with another embodiment of the present invention.
Figure 12:
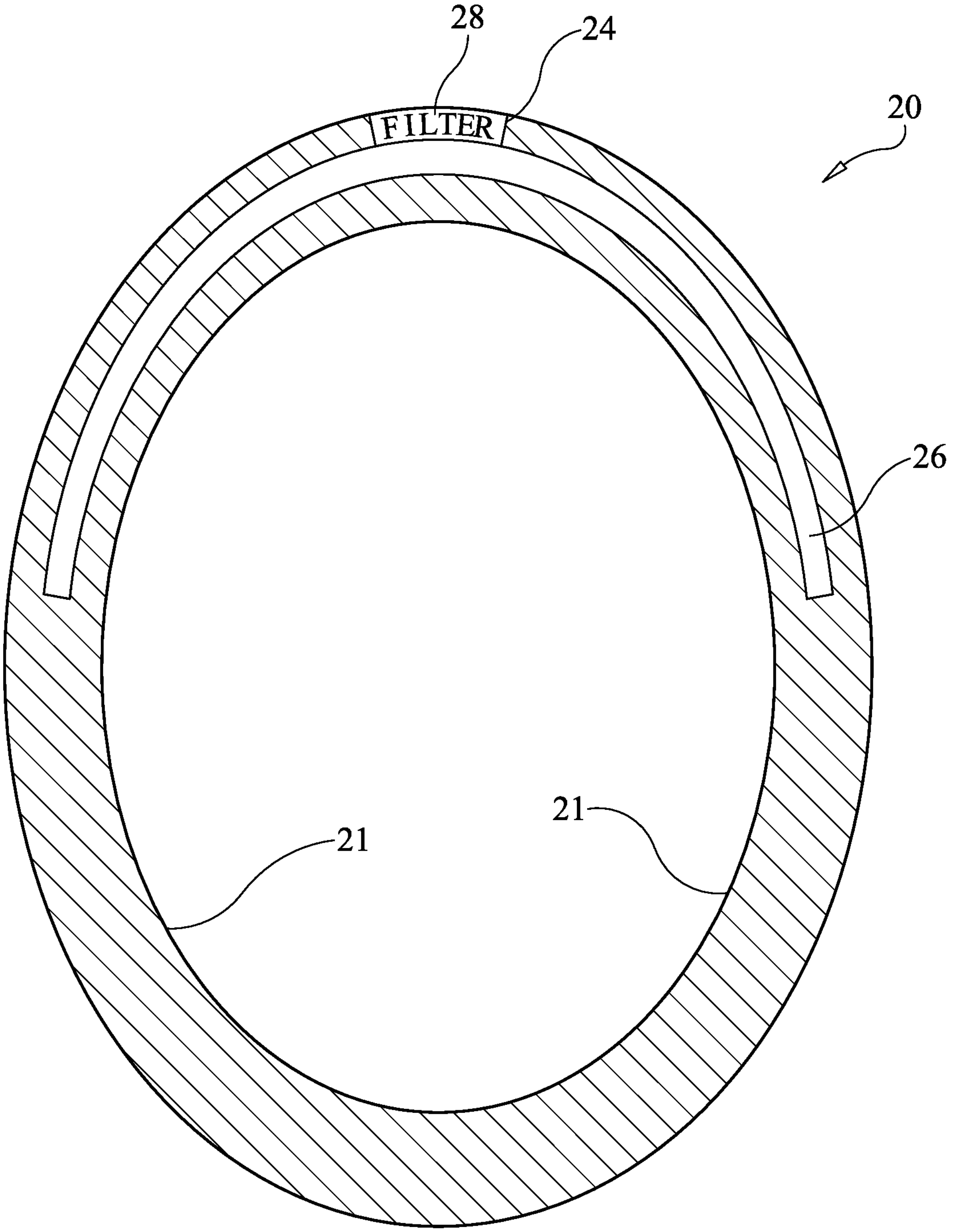
FIG. 12 is a cross-sectional view of a personal protected-air system's ring further including an air filter in the ring's external port in accordance with another embodiment of the present invention.
Figure 13:
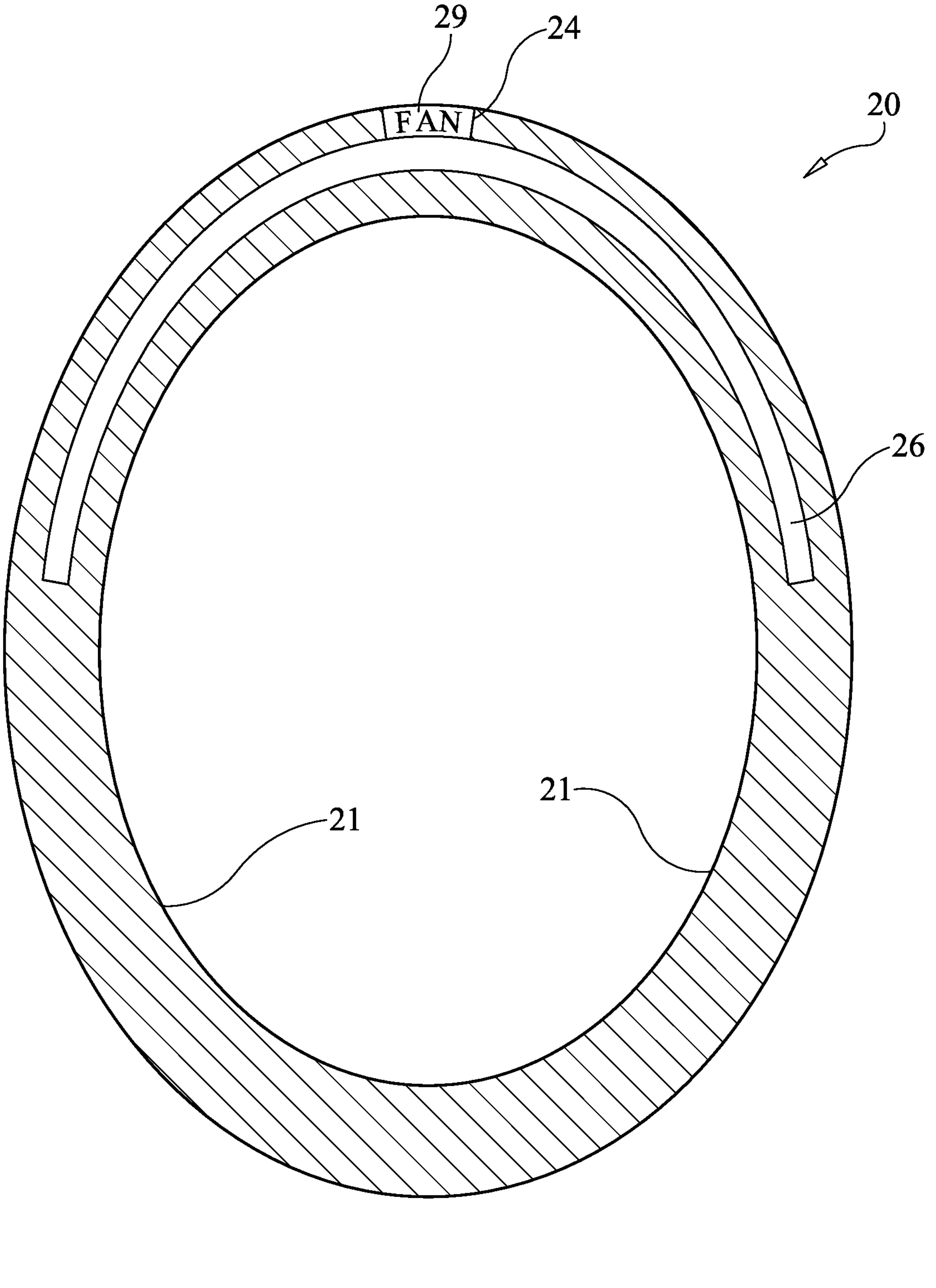
FIG. 13 is a cross-sectional view of a personal protected-air system's ring further including a fan in the ring's external port in accordance with another embodiment of the present invention.

In other embodiments of the present invention, ring 20 can have one or more additional features to enhance the functionality of the personal protected-air system for a particular application. Several exemplary features will be described with the aid of FIGS. 11-13 where each figure presents a cross-sectional view of ring 20. In FIG. 11, a gel pack 27 of freezable material can be disposed in manifold 26. Gel pack 27 can be removably installed in ring 20 or permanently installed therein without departing from the scope of the present invention. Prior to use, gel pack 27 (or ring 20 with gel pack 27 installed therein) is refrigerated to freeze the material in gel pack 27. Then, in use, breathable air entering manifold 26 is cooled prior to exiting the ring's vents as described earlier herein. The cooled breathable air improves the user's breathing experience when the system's face mask is placed over the user's nostrils and mouth as described above. Provisions can be made to store additional/replacement gel packs on ring 20. FIG. 12 illustrates ring 20 having an air filter 28 disposed in port 24 to, for example, filter out particulates of desired size. FIG. 13 illustrates ring 20 having a fan 29 disposed in port 24 to control the pressure of breathable air introduced into manifold 26 as a means to control the force of the breathable air exiting the ring's vents as described above.

It is to be understood that any combination of the features described herein could be incorporated into a personal protected-air system without departing from the scope of the present invention. The selected features that are to be combined can be chosen to satisfy one or more application-specific criteria.

The advantages of the present invention are numerous. A user can safely enclose and protect his/her breathing space in a comfortable fashion. The personal protected-air system is ideally suited for everyday users, workers exposed to contaminated/dirty/dusty environments, travelers who are confined to air/land vehicles having enclosed and shared cabin spaces, users who will be exposed to crowded environments such as airports, train stations, bus depots, stadiums or arenas, malls, etc. The system's face mask does not use or require any "loops" to attach the face mask to a user's ears thereby avoiding the discomfort associated therewith. Furthermore, the system's ring allows the system's face mask to be held away from the user's nostrils, mouth and chin thereby greatly improving the user's mask-wearing experience. The system can be configured in a variety of ways to support a myriad of application criteria, price points, etc.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A personal protected-air system, comprising:

a ring adapted to fit over a user's head, said ring including a port accessible from a first external region of said ring and adapted to receive breathable air, a manifold in fluid communication with said port, and a plurality of vents in fluid communication with said manifold and a second external region of said ring, said vents being distributed about a portion of said ring; and an open-ended sleeve having a first open end, a second open end, and flexible mask material extending from said first open end to said second open end, said first open end coupled to said ring wherein said vents are disposed within an interior space that lies within confines of said sleeve, a portion of said second open end adapted to lie against the user's cheeks and nose bridge wherein said flexible mask material is spaced apart from the user's nostrils and mouth by an air space and a remainder of said second open end adapted to wrap about a lower portion of the user's head, wherein the breathable air enters the air space via said vents.

2. A personal protected-air system as in claim 1, wherein the breathable air originates at an air nozzle, said system further comprising a hose for coupling to said port and adapted to be coupled to the air nozzle, wherein the breathable air exiting the air nozzle is introduced into the air space via successive movement through said hose, said port, said manifold, and said vents.

3. A personal protected-air system as in claim 1, wherein said ring is adapted to encircle the user's neck, said ring including a cushion adapted to at least partially encircle the user's neck.

4. A personal protected-air system as in claim 1, wherein said ring includes an elasticized opening adapted to fit over the user's head and adapted to completely engage a periphery of the user's neck.

5. A personal protected-air system as in claim 1, further comprising a sealable aperture disposed in said mask material and adapted to be positioned near the user's mouth when said portion of said second open end lies against the user's cheek and nose bridge.

6. A personal protected-air system as in claim 1, further comprising a sealed gel pack of freezable material disposed in said manifold.

7. A personal protected-air system as in claim 1, further comprising an air filter disposed in said port.

8. A personal protected-air system as in claim 1, further comprising a fan disposed in said port for drawing the breathable air into said manifold.

9. A personal protected-air system as in claim 1, wherein said portion of said second open end is elasticized.

10. A personal protected-air system, comprising:

a ring having a central opening adapted to fit over a user's head and encircle the user's neck, said ring including a port accessible from a first external region of said ring and adapted to receive breathable air, a manifold in fluid communication with said port, and a plurality of vents in fluid communication with said manifold and a second external region of said ring, said vents being distributed about a portion of said ring wherein, when the breathable air is under pressure in said manifold, the breathable air exits said manifold through said vents; and an open-ended sleeve having a lower open end, an upper open end, and flexible mask material extending from said lower open end to said upper open end, said lower open end coupled to said ring wherein said vents are disposed within an interior space that lies within confines of said sleeve, a portion of said upper open end adapted to lie against the user's cheeks and nose bridge and a remainder of said upper open end adapted to wrap about a lower portion of the user's head, and said ring and said sleeve configured to create an air space between said flexible mask material and the user's face when said upper open end lies against the user's cheeks and nose bridge wherein the breathable air enters the air space via said vents.

11. A personal protected-air system as in claim 10, wherein the breathable air originates at an air nozzle, said system further comprising a hose for coupling to said port and adapted to be coupled to the air nozzle, wherein the breathable air exiting the air nozzle is introduced into the air space via successive movement through said hose, said port, said manifold, and said vents.

12. A personal protected-air system as in claim 10, further comprising a cushion coupled to said ring and adapted to at least partially encircle the user's neck when said upper edge of said face mask is fitted snugly against the user's cheek and nose bridge.

13. A personal protected-air system as in claim 10, wherein said ring includes an elasticized opening adapted to fit over the user's head and adapted to completely engage a periphery of the user's neck.

14. A personal protected-air system as in claim 10, further comprising a sealable aperture disposed in said mask material and adapted to be positioned near the user's mouth when said portion of said upper open end lies against the user's cheek and nose bridge.

15. A personal protected-air system as in claim 10, further comprising a sealed gel pack of freezable material disposed in said manifold.

16. A personal protected-air system as in claim 10, further comprising an air filter disposed in said port.

17. A personal protected-air system as in claim 10, further comprising a fan disposed in said port for drawing the breathable air into said manifold.

18. A personal protected-air system as in claim 10, wherein said portion of said upper open end is elasticized.

19. A personal protected-air system, comprising:

a ring adapted to fit over a user's head and encircle the user's neck, said ring including a port accessible from a first external region of said ring and adapted to receive breathable air, a manifold in fluid communication with said port, and a plurality of vents in fluid communication with said manifold and a second external region of said ring, said vents being distributed about a portion of said ring wherein, when the breathable air is under pressure in said manifold, the breathable air exits said manifold through said vents;

an open-ended first sleeve having a lower open end, an upper open end, and flexible mask material extending from said lower open end to said upper open end, said lower open end coupled to said ring wherein said vents are disposed within an interior space that lies within confines of said first sleeve, a portion of said upper open end adapted to lie against the user's cheeks and nose bridge and a remainder of said upper open end adapted to wrap about a lower portion of the user's head, and said ring and said first sleeve configured to create an air space between said flexible mask material the user's face when said upper open end lies against the user's cheeks and nose bridge wherein the breathable air enters the air space via said vents;

a cushion coupled to said ring and adapted to at least partially encircle the user's neck when said upper edge of said face mask lies against the user's cheek and nose bridge; and an elasticized and open-ended second sleeve coupled to at least one of said ring and said cushion and adapted to fit over the user's head, said second sleeve being adapted to completely engage a periphery of the user's neck.

20. A personal protected-air system as in claim 19, wherein the breathable air originates at an air nozzle, said system further comprising a hose for coupling to said port and adapted to be coupled to the air nozzle, wherein the breathable air exiting the air nozzle is introduced into the air space via successive movement through said hose, said port, said manifold, and said vents.

21. A personal protected-air system as in claim 19, further comprising a sealable aperture disposed in said mask material and adapted to be positioned near the user's mouth when said portion of said upper open end lies against the user's cheek and nose bridge.

22. A personal protected-air system as in claim 19, further comprising a sealed gel pack of freezable material disposed in said manifold.

23. A personal protected-air system as in claim 19, further comprising an air filter disposed in said port.

24. A personal protected-air system as in claim 19, further comprising a fan disposed in said port for drawing the breathable air into said manifold.

25. A personal protected-air system as in claim 19, wherein said portion of said upper open end is elasticized.

* * * * *